United States Patent
Komatsu et al.

(10) Patent No.: US 12,176,542 B2
(45) Date of Patent: Dec. 24, 2024

(54) ANODE INTERLAYER FOR ALL-SOLID-STATE BATTERIES AND METHOD OF MANUFACTURING THE ALL-SOLID-STATE BATTERIES

(71) Applicant: Nissan North America, Inc., Franklin, TN (US)

(72) Inventors: Hideyuki Komatsu, San Diego, CA (US); Shigemasa Kuwata, Palo Alto, CA (US); Balachandran Gadaguntla Radhakrishnan, San Mateo, CA (US); Maarten Sierhuis, San Francisco, CA (US); Naoki Ueda, Kanagawa (JP); Kazuyuki Sakamoto, Kanagawa (JP); John Lawson, San Francisco, CA (US)

(73) Assignees: Nissan North America, Inc., Franklin, TN (US); United States of America as Represented by the Administrator of NASA, Washington, DC (US)

( * ) Notice: Subject to any disclaimer, the term of this patent is extended or adjusted under 35 U.S.C. 154(b) by 130 days.

(21) Appl. No.: 17/404,541

(22) Filed: Aug. 17, 2021

(65) Prior Publication Data
US 2023/0059842 A1 Feb. 23, 2023

(51) Int. Cl.
*H01M 4/02* (2006.01)
*H01M 4/04* (2006.01)
(Continued)

(52) U.S. Cl.
CPC .......... *H01M 4/62* (2013.01); *H01M 4/0404* (2013.01); *H01M 4/0423* (2013.01);
(Continued)

(58) Field of Classification Search
CPC ................................ H01M 10/0562
See application file for complete search history.

(56) References Cited

U.S. PATENT DOCUMENTS

| 2002/0012846 A1* | 1/2002 | Skotheim | H01M 50/46 |
| | | | 429/231.95 |
| 2004/0023106 A1* | 2/2004 | Benson | H01M 10/0436 |
| | | | 429/126 |

(Continued)

OTHER PUBLICATIONS

Zhang, Qing, et al. "Sulfide-based solid-state electrolytes: synthesis, stability, and potential for all-solid-state batteries." Advanced Materials 31.44 (2019): 1901131. (Year: 2019).*
(Continued)

*Primary Examiner* — Haixia Zhang
(74) *Attorney, Agent, or Firm* — Young Basile Hanlon & MacFarlane, P.C.

(57) ABSTRACT

A method of manufacturing an all-solid-state battery cell includes depositing an interlayer directly onto an anode current collector; depositing a solid electrolyte onto the interlayer opposite the anode current collector; forming a cathode on the solid electrolyte opposite the interlayer, wherein the cathode contains one or more lithium-containing compounds; and applying pressure to achieve uniform contact between layers. The manufactured all-solid-state battery cell is anode-free prior to charging. The interlayer is configured such that lithium metal is deposited between the interlayer and the anode current collector during charging, the interlayer prevents contact between the lithium metal and the solid electrolyte, and the interlayer has a greater density than a density of the solid electrolyte.

6 Claims, 5 Drawing Sheets

(51) Int. Cl.
     *H01M 4/62*           (2006.01)
     *H01M 4/66*           (2006.01)

(52) U.S. Cl.
     CPC ........... *H01M 4/043* (2013.01); *H01M 4/662* (2013.01); *H01M 2004/021* (2013.01); *H01M 2004/027* (2013.01)

(56) References Cited

U.S. PATENT DOCUMENTS

| | | | |
|---|---|---|---|
| 2004/0131944 A1* | 7/2004 | Visco | H01M 4/381 |
| | | | 429/246 |
| 2019/0051933 A1 | 2/2019 | Li et al. | |
| 2019/0088991 A1* | 3/2019 | Hegde | H01M 4/366 |
| 2021/0226249 A1 | 7/2021 | Ogata et al. | |

OTHER PUBLICATIONS

Lee, YG., Fujiki, S., Jung, C. et al. High-energy long-cycling all-solid-state lithium metal batteries enabled by silver- carbon composite anodes. Nat Energy 5, 299-308 (2020). https://doi.org/10.1038/s41560-020-0575-z.

* cited by examiner

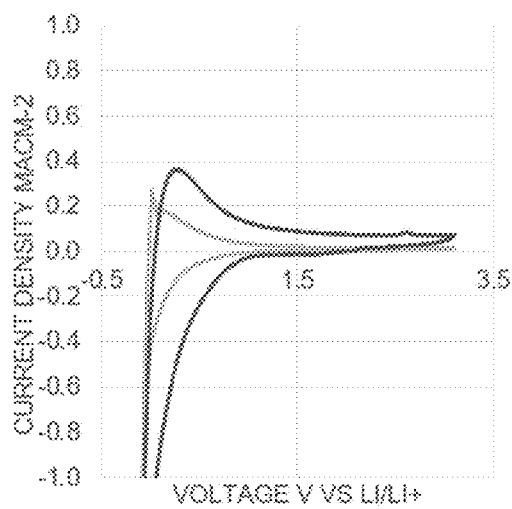
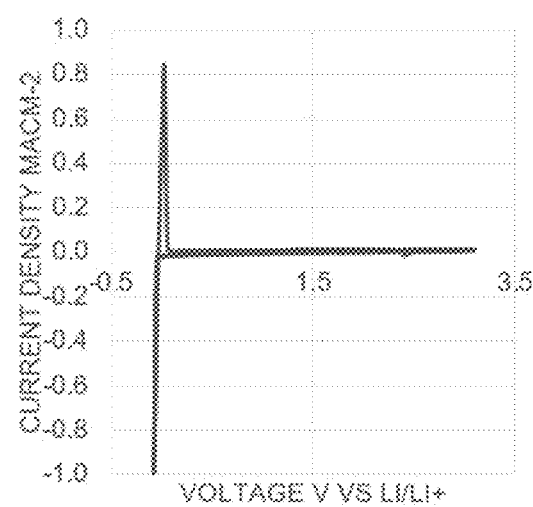
FIG. 8A
FIG. 8B

ANODE INTERLAYER FOR ALL-SOLID-STATE BATTERIES AND METHOD OF MANUFACTURING THE ALL-SOLID-STATE BATTERIES

TECHNICAL FIELD

This disclosure relates to an interlayer provided between the solid electrolyte and the anode current collector of an all-solid-state battery, and methods of manufacturing the all-solid-state battery.

BACKGROUND

Advances have been made toward high energy density batteries, including both lithium metal and lithium-ion batteries. However, these advances are limited by the underlying choice of materials and electrochemistry. Traditional lithium-ion batteries either use organic liquid electrolytes, prone to negative reactions with active materials and potentially flammable, or ionic liquid electrolytes, with increased viscosities and lower ionic conductivity. All-solid-state batteries can address some or all of these issues, as well as produce higher energy densities. However, the large interfacial resistance at the electrolyte/electrode interface and the interfacial stability and compatibility due to lithium reactivity affect the electrochemical performance of batteries. Un-uniform lithium plating, formation of lithium dendrites and side reactions between lithium metal and the solid electrolyte contribute to the decrease in performance.

SUMMARY

Disclosed herein are implementations of an all-solid-state battery cell having an anode interlayer, all-solid-state batteries comprising multiple battery cells, and methods of making anode-free all-solid-state battery cells.

As disclosed herein, an all-solid-state battery cell can comprise an anode current collector, a solid electrolyte, and an interlayer between the anode current collector and the solid electrolyte. The interlayer is configured such that lithium metal is deposited between the interlayer and the anode current collector during charging, the interlayer prevents contact between the lithium metal and the solid electrolyte, and the interlayer has a greater density than a density of the solid electrolyte.

A method of manufacturing an all-solid-state battery cell includes depositing an interlayer directly onto an anode current collector; depositing a solid electrolyte onto the interlayer opposite the anode current collector; forming a cathode on the solid electrolyte opposite the interlayer, wherein the cathode contains one or more lithium-containing compounds; and applying pressure to achieve uniform contact between layers. The manufactured all-solid-state battery cell is anode-free prior to charging. The interlayer is configured such that lithium metal is deposited between the interlayer and the anode current collector during charging, the interlayer prevents contact between the lithium metal and the solid electrolyte, and the interlayer has a greater density than a density of the solid electrolyte.

Variations in these and other aspects, features, elements, implementations, and embodiments of the methods and apparatus disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 8A and 8B compare the energy density of two different ASSB cells by comparing charging at 1 mV/s and 10 mV/s. In FIG. 8A, an ASSB cell is formed with an interlayer of Ag—C with a 10 µm thickness. In FIG. 8B, an ASSB cell is formed with the interlayer disclosed herein.

DETAILED DESCRIPTION

All-solid-state batteries (ASSBs) offer higher volumetric and gravimetric energy densities than conventional lithium-ion batteries. The lithium metal anode has a theoretical gravimetric capacity approximately ten times higher than graphite-based anodes. However, non-uniform electrodeposition of lithium, which results in dendrites, is holding back the widespread adoption of lithium metal batteries. During battery operation, lithium is continuously deposited or removed depending on charge/discharge cycles. As the lithium is deposited, it may not deposit uniformly, forming dendrites, which are tiny, rigid branch-like structures and needle-like projections. The formation of dendrites results in a non-uniform lithium surface which further exasperates non-uniform lithium deposition. As the dendrites grow from this non-uniform deposition, battery deterioration can occur. Contact between the solid electrolyte and the lithium metal can be lost, with gaps forming between the lithium and solid electrolyte. Both the low-density lithium dendrite deposition and the loss of contact between layers adds to the cell expansion during charging. As the lithium dendrites reach the other electrode, short circuiting of the battery can occur. Also, side reactions between lithium metal and the solid electrolyte can further contribute to the decrease in performance.

Disclosed herein is an all-solid-state battery cell having an anode interlayer an interlayer between the anode current collector and the solid electrolyte of the ASSB. The interlayer is formed directly onto the anode current collector, with the solid electrolyte deposited onto the interlayer. The interlayer homogeneously and densely distributes the lithium between the interlayer and the anode current collector during charging. The interlayer maintains uniform contact with the solid electrolyte. The dense lithium plating and maintenance of contact between layers suppresses cell expansion during charging, improving volumetric energy density.

Figure 1:
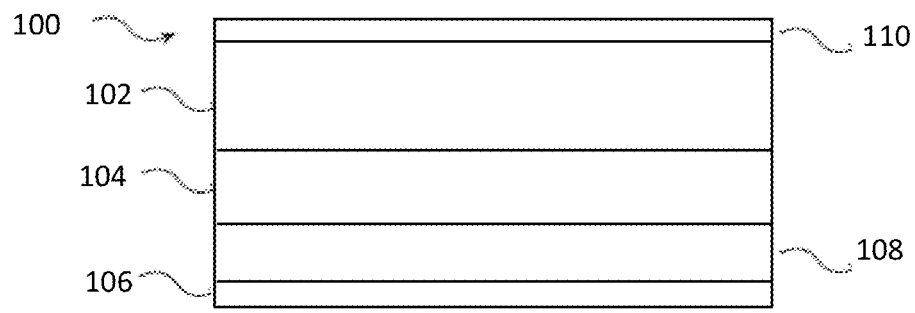
FIG. 1 is a cross-sectional schematic of an anode-free ASSB as disclosed herein.

An ASSB cell 100 as disclosed is illustrated schematically in cross-section in FIG. 1. The ASSB cell 100 of FIG. 1 is configured as a layered battery cell that includes as active layers a cathode 102 having active cathode material layer, a solid electrolyte 104, and an anode current collector 106. An interlayer 108 as disclosed herein is formed on the anode current collector 106 between the anode current collector 106 and the solid electrolyte 104. In addition, the ASSB cell 100 of FIG. 1 may include a cathode current collector 110, configured such that the active layers are interposed between the anode current collector 106 and the cathode current collector 110. An ASSB can be comprised of multiple ASSB cells 100.

The anode current collector 106 can be, as a non-limiting example, a sheet or foil and is made of non-corrosive stainless steel, such as SUS 304.

The solid electrolyte 104 can be, as non-limiting examples, sulfide compounds (e.g., Argyrodite, LGPS, LPS, etc.), garnet structure oxides (e.g., LLZO with various dopants), NASICON-type phosphate glass ceramics (LAGP), oxynitrides (e.g., lithium phosphorus oxynitride or LIPON), and polymers (PEO).

The cathode current collector 110 can be, as a non-limiting example, an aluminum sheet or foil, carbon paper or graphene paper.

The cathode active material layer 102 has cathode active material that can include one or more lithium transition metal oxides and lithium transition metal phosphates which can be bonded together using binders and optionally conductive fillers such as carbon black. Lithium transition metal oxides and lithium transition metal phosphates can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. The cathode active material layer 102 can be a sulfur-based active material and can include $LiSO_2$, $LiSO_2Cl_2$, $LiSOCl_2$, and $LiFeS_2$, as non-limiting examples.

Figure 2:
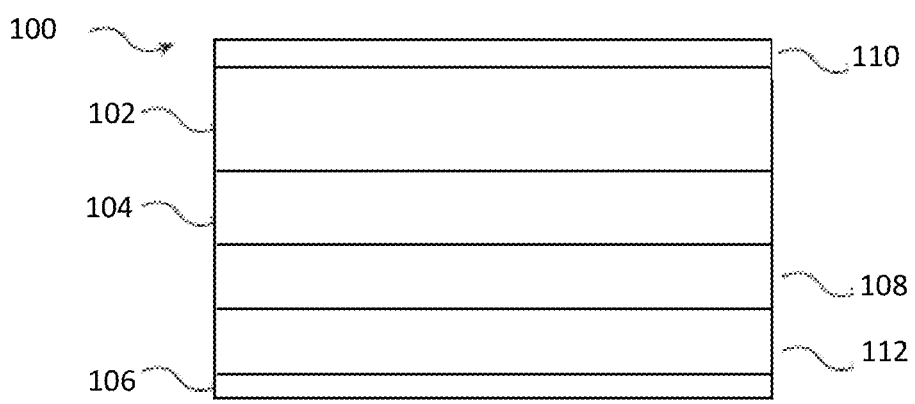
FIG. 2 is a cross-sectional schematic of the anode-free ASSB of FIG. 1 after one charge cycle.

FIG. 1 illustrates the anode-free ASSB cell 100 disclosed herein in a manufactured state, prior to charging. FIG. 2 illustrates the ASSB cell 100 after at least one charge, wherein lithium from the lithium-containing cathode material of the cathode 102 is deposited during charging between the interlayer 108 and the anode current collector 106, forming the lithium metal anode 112. It is noted that some of the interlayer material, less than 1.0%, may remain on the anode current collector during charging.

The interlayer 108 has a greater density than a density of the solid electrolyte 104. This high-density interlayer 108 uniformly distributes lithium ions, forming a densely packed lithium layer at the anode 112, shown in FIG. 2. A lithium ionic conductivity of the interlayer 108 is greater than an electronic conductivity of the interlayer 108. This ratio of ionic conductivity to electronic conductivity prevents electrons from penetrating through the interlayer 108, allowing lithium ions to plate between the interlayer 108 and the anode current collector 106 at the anode 112. When electrons are able to penetrate the interlayer 108 reaching the solid electrolyte 104, the lithium will plate at the interface of the interlayer 108 and the solid electrolyte 104, resulting in side reactions at the lithium/solid electrolyte 104 interface.

The interlayer 108 can be about 100 nm in thickness or more. Due to the advantages of keeping the cell thickness at a minimum, the thickness of the interlayer 108 can be as thin as possible while providing the required effect on performance.

The interlayer 108 between the solid electrolyte 104 and the anode current collector 106 comprises one or more ion-conducting material with a stable potential window of 0 V to 2.0 V against lithium. Stability against lithium metal represents a material's inertness to lithium. A material is said to be stable if it does not undergo spontaneous reaction with lithium at 0 V. Materials that are stable against lithium have a reduction potential (vs. lithium) at or near 0 V. The ion-conducting materials herein are stable or near stable against lithium.

Ionic conductivity is the property most often used to study ionic migration in solids. The ionic conductivity of a solid measures how easily an ion can move from one site to another through defects in the crystal lattice. While ionic conductivity clearly depends on the crystal structure, it is also influenced by the microstructure that emerges from the processing of the solid. To work with a material property that is independent of processing conditions, lithium-ion migration energy, i.e., the lithium-ion migration barrier, is used as a measure of the ionic migration of lithium compounds. The ion-conducting materials herein have a low migration barrier, having an estimated migration barrier, or estimated lithium-ion migration energy, of 0.5 eV or less. The interlayer 108 is selected from the group consisting of LiCl, LiBr, $Li_2O$, $Li_2Se$, LiF, $Li_2S$, LiI, $Li_2IBr$, $Sr_4Li(BN_2)_3$, $LiYO_2$, $LiNbO_2$, $LiLaO_2$, $LiGdO_2$, $LiHfO_6$, $LiErO_2$, $CsLi_2Cl_3$, $Cs_3Li_2I_5$, $LiHoO_2$, $LiTmO_2$, $LiDyO_2$, $Li_7La_3Hf_2O_{12}$, and $Li_7VN_4$. The interlayer 108 material and its associated estimated migration barrier are shown below in Table 1.

TABLE 1

| Formula | Migration Barrier/eV |
|---|---|
| LiCl | 0.349 |
| LiBr | 0.350 |
| $Li_2O$ | 0.259 |
| $Li_2Se$ | 0.327 |
| LiF | 0.241 |
| $Li_2S$ | 0.262 |
| LiI | 0.352 |
| $Li_2IBr$ | 0.454 |
| $Sr_4Li(BN_2)_3$ | 0.109 |
| $LiYO_2$ | 0.411 |
| $LiNbO_2$ | 0.434 |
| $LiLaO_2$ | 0.354 |
| $LiGdO_2$ | 0.352 |
| $Li_8HfO_6$ | 0.419 |
| $LiErO_2$ | 0.428 |
| $CsLi_2Cl_3$ | 0.486 |
| $CS_3Li_2I_5$ | 0.471 |
| $LiHoO_2$ | 0.381 |
| $LiTmO_2$ | 0.471 |
| $LiDyO_2$ | 0.361 |
| $Li_7La_3Hf_2O_{12}$ | 0.470 |
| $Li_7VN_4$ | 0.425 |

The interlayer 108 disclosed herein is configured such that lithium metal is deposited between the interlayer 108 and the anode current collector 112 during charging, the interlayer 108 preventing contact between the lithium metal and the solid electrolyte 104.

Figure 3:
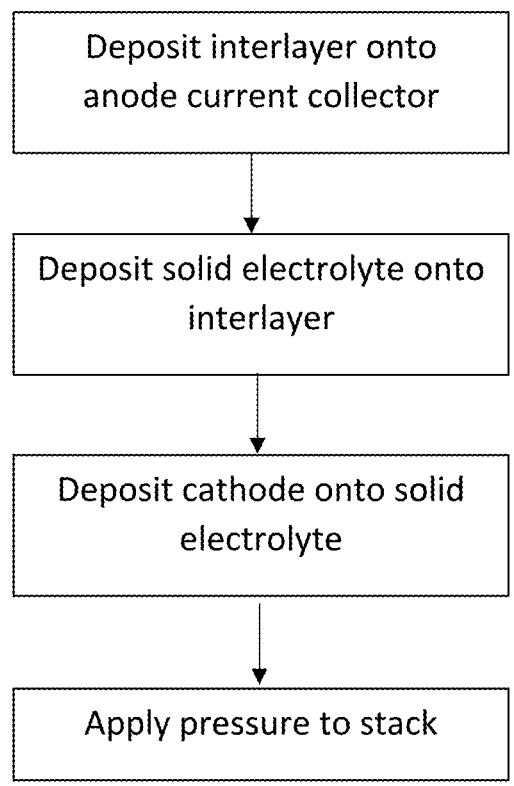
FIG. 3 is a flow diagram of a method of manufacturing the anode-free ASSB.

Also disclosed herein are methods of making the ASSB cell 100. A method of manufacturing the ASSB cell is shown in the flow diagram of FIG. 3 and includes depositing the interlayer 108 directly onto the anode current collector 106. The method of deposition can be electronic beam vapor deposition, for example. Depositing the interlayer 108 directly onto the anode current collector 106 allows for a thin, uniform, dense layer. If the interlayer 108 is deposited onto a pre-charge lithium metal anode, the lithium is too reactive and the interlayer will not be uniform. If the interlayer 108 is deposited onto the solid electrolyte 104, the air sensitivity of the solid electrolyte prevents a dense, uniform interlayer.

After the interlayer 108 is deposited, the solid electrolyte 104 is deposited onto the interlayer 108 opposite the anode current collector 106. The cathode 102 if formed on the solid electrolyte 104 opposite the interlayer 108. A cathode current collector 110 can be applied if used. The order of deposition of the layers can be altered, so long as the interlayer is deposited onto the anode current collector. Pressure is applied to the stack to achieve uniform contact between layers. The manufactured all-solid-state battery cell is anode-free prior to charging. The interlayer is configured such that lithium metal is deposited between the interlayer and the anode current collector during charging, the interlayer prevents contact between the lithium metal and the solid electrolyte, and the interlayer has a greater density than a density of the solid electrolyte. The anode-free ASSB cell is easy to make and can be mass produced.

Figure 4:
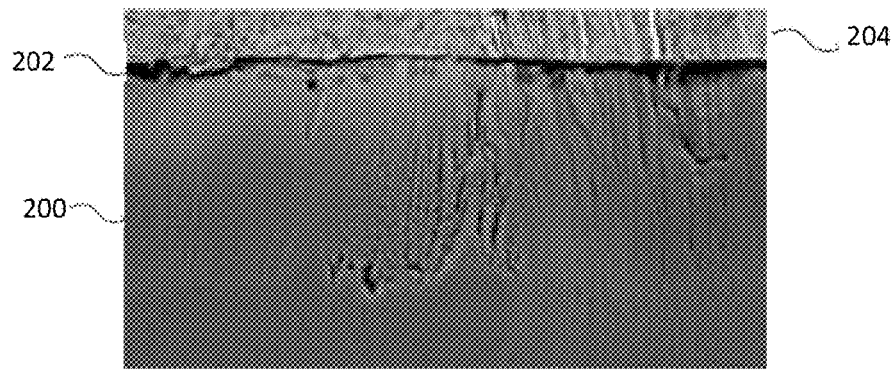
FIG. 4 is a cross-section of an ASSB cell without the disclosed interlayer after one charge cycle, taken with a scanning electron microscope (SEM).
Figure 5:
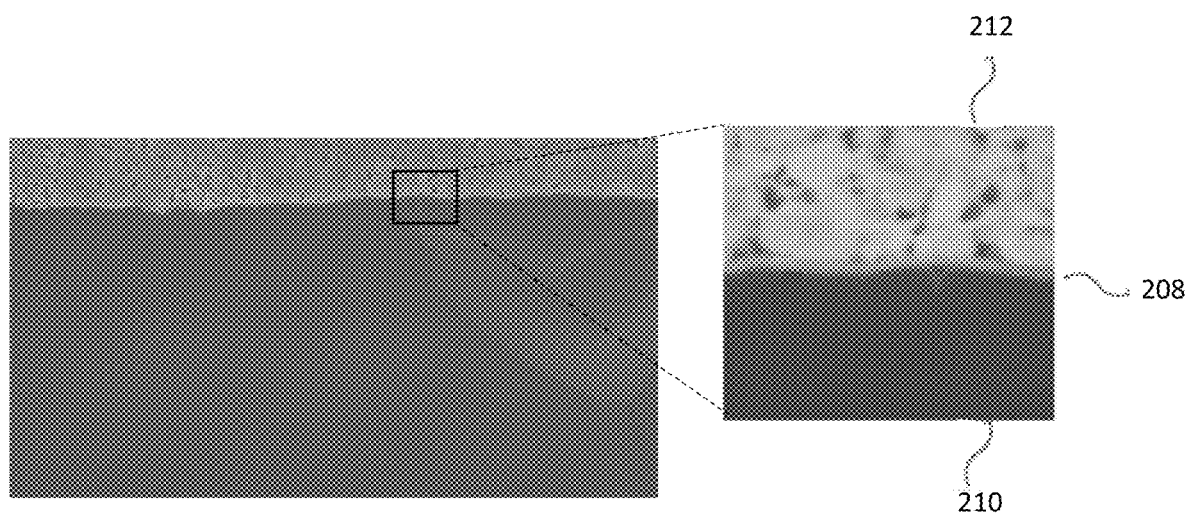
FIG. 5 is a cross-section of an ASSB cell with the disclosed interlayer after one charge cycle, taken with an SEM, with the interlayer enlarged.

FIG. 4 is an enlarged photo of a cross section of an ASSB cell without the disclosed interlayer after one charge cycle. As shown, the lithium metal 200 is not deposited uniformly and not deposited densely. A large gap 202 is evident between the lithium metal 200 and the solid electrolyte 204. FIG. 5 is an enlarged photo of a cross section of an ASSB cell with the disclosed interlayer, here formed of LiCl. The enlarged portion clearly shows the smooth and dense interlayer 208 between dense, uniformly plated lithium metal 210 after one charge cycle. There is no gap between the interlayer 208 and the solid electrolyte 212.

Figure 6:
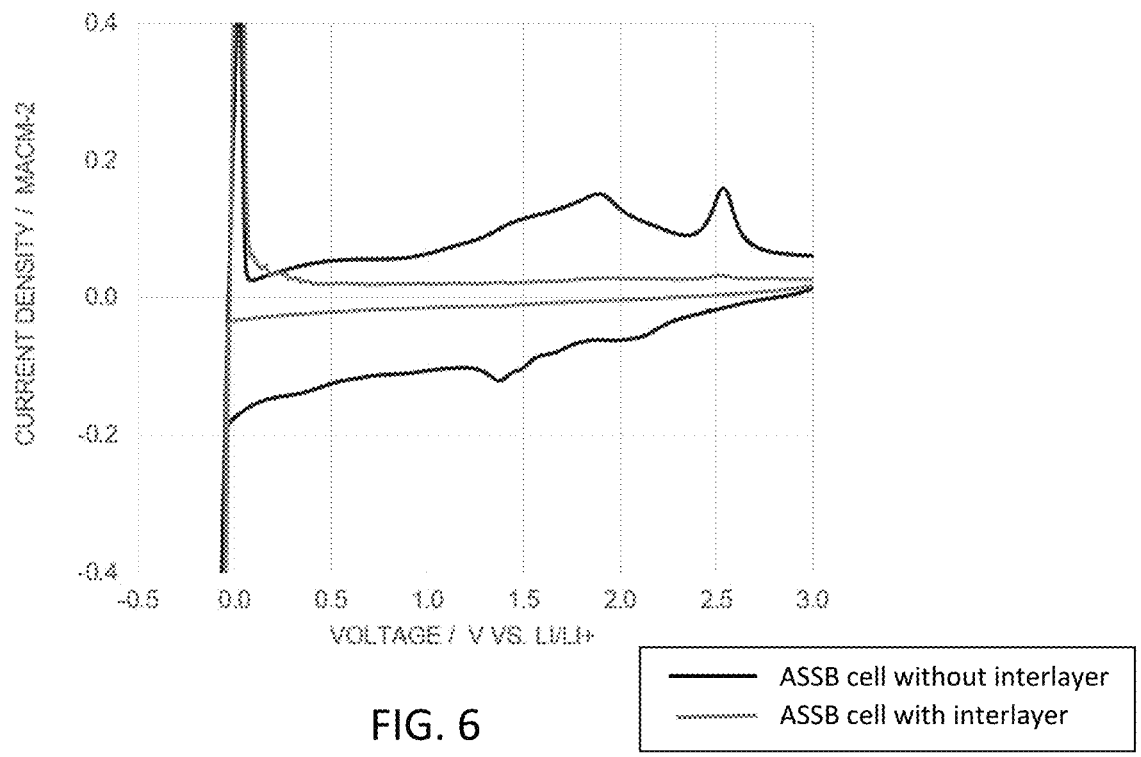
FIG. 6 is a graph of current density versus voltage, illustrating how the interlayer protects the solid electrolyte from degradation caused by the lithium metal reactivity.
Figure 7:
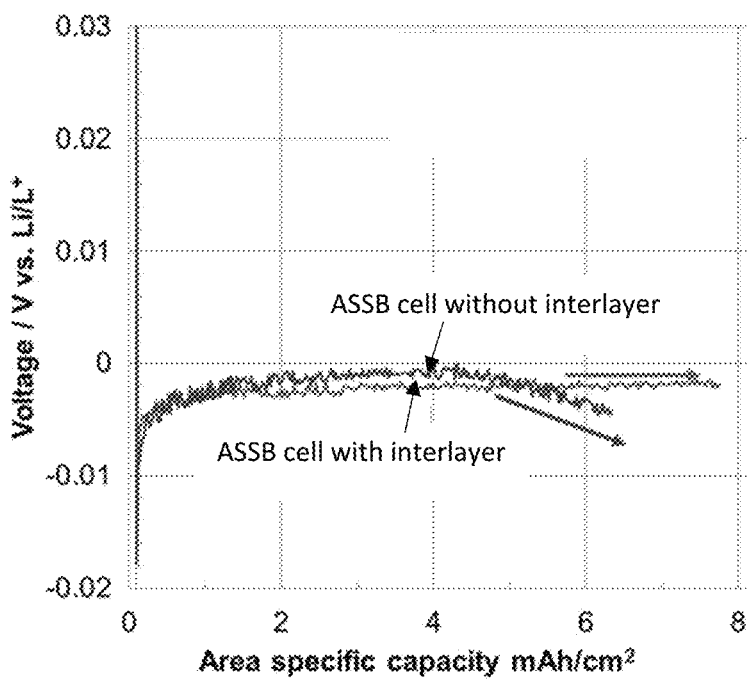
FIG. 7 is a graph of voltage versus area specific capacity for the same ASSB cell in FIG. 6, illustrating how the interlayer improves the capacity of the ASSB.

An ASSB cell was produced without an interlayer and with an interlayer. The interlayer material was LiCl. The ASSB cells were cycled 200 times. A significant durability improvement was seen in the ASSB cell with the interlayer. FIG. 6 is a graph of current density versus voltage, illustrating how the interlayer protects the solid electrolyte from degradation caused by the lithium metal reactivity. FIG. 7 is a graph of voltage versus area specific capacity for the same ASSB cells, illustrating how the interlayer improves the capacity of the ASSB.

FIGS. 8A and 8B compare the energy density of two different ASSB cells by comparing charging at 1 mV/s and 10 mV/s. In FIG. 8A, an ASSB cell is formed with an interlayer of Ag—C with a 10 μm thickness, an NMC cathode and an argyrodite (LPSCI) electrolyte. In FIG. 8B, an ASSB cell as disclosed herein is formed with an interlayer of LiCl with a 1 μm thickness, an NMC cathode and an argyrodite (LPSCI) electrolyte. The ASSB cell in FIG. 8A showed a significant delay at the 10 mV/s rate, indicating a delay in quick-charge. The ASSB cell in FIG. 8B shows no difference between the two scan rates, indicating quick-charging capability and high energy density.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An all-solid-state battery cell, comprising:
   an anode current collector;
   a solid electrolyte; and
   an interlayer between the anode current collector and the solid electrolyte, the interlayer configured wherein:
   the interlayer is selected from the group consisting of $Li_2Se$ and $LiNbO_2$;
   lithium metal is deposited between the interlayer and the anode current collector during charging;
   the interlayer prevents contact between the lithium metal and the solid electrolyte; and
   the interlayer has a greater density than a density of the solid electrolyte.

2. The all-solid-state battery cell of claim 1, wherein a lithium ionic conductivity of the interlayer is greater than an electronic conductivity of the interlayer.

3. The all-solid-state battery cell of claim 1, wherein the interlayer is a material with a stable potential window of 0 V to 2.0 V against lithium.

4. The all-solid-state battery cell of claim 1, wherein the interlayer has a thickness of at least 100 nm.

5. The all-solid-state battery cell of claim 1, further comprising a cathode and a cathode current collector.

6. The all-solid-state battery cell of claim 1, wherein the solid electrolyte is a sulfide compound.

* * * * *